(12) United States Patent
Willen

(10) Patent No.: US 8,311,745 B2
(45) Date of Patent: *Nov. 13, 2012

(54) METHOD FOR SPATIAL FILTERING OF ELECTROMAGNETIC SURVEY DATA

(75) Inventor: Dennis E. Willen, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,164

(22) Filed: Nov. 17, 2011

(65) Prior Publication Data

US 2012/0061092 A1     Mar. 15, 2012

Related U.S. Application Data

(63) Continuation of application No. 12/087,371, filed as application No. PCT/US2006/044307 on Nov. 15, 2006, now Pat. No. 8,090,539.

(60) Provisional application No. 60/763,473, filed on Jan. 30, 2006.

(51) Int. Cl.
*G06F 15/00* (2006.01)
*G01V 1/38* (2006.01)
*G01V 3/18* (2006.01)

(52) U.S. Cl. ............................................. 702/13; 367/22
(58) Field of Classification Search .................... 702/13, 702/17; 367/22, 25
See application file for complete search history.

(56) References Cited

U.S. PATENT DOCUMENTS

| 6,925,386 B2 | 8/2005 | Pramik et al. |
| 8,090,539 B2 * | 1/2012 | Willen .......................... 702/13 |
| 2009/0103395 A1 | 4/2009 | Willen |
| 2009/0120636 A1 | 5/2009 | Summerfield et al. |

FOREIGN PATENT DOCUMENTS

| GB | 2412639 | 5/2005 |
| WO | WO2005/010320 | 2/2005 |
| WO | WO2005/010560 | 2/2005 |
| WO | WO2006/088591 | 8/2006 |

OTHER PUBLICATIONS

Allen, J. et al. (1977), "A Unified Approach to Short-Time Fourier Analysis and Synthesis," *Proc. of the IEEE* 65, pp. 1558-1564.
Bhattacharyya, B.K. (1972), "Design of Spatial Filters and Their Application to High-Resolution Aeromagnetic Data," *Geophysics* 37, pp. 68-91.

(Continued)

*Primary Examiner* — Bryan Bui
(74) *Attorney, Agent, or Firm* — ExxonMobil Upstream Research Company Law Dept.

(57) ABSTRACT

The invention is a method for suppressing noise in controlled source electromagnetic survey data based on the frequency content of the noise. The invention recognizes that some data variations across bins cannot be attributed to resistivity variations within the earth. This variation across bins constitutes a model of noise in such surveys, and the invention mitigates noises that obey this model. Noise varying rapidly in either space or time is removed by filtering temporal frequency domain data (131) with a low-pass filter (134) having a selected cutoff frequency (133).

24 Claims, 8 Drawing Sheets

OTHER PUBLICATIONS

Choi, H. et al. (1989), "Improved Time-Frequency Representation of Multicomponent Signals Using Exponential Kernels," *IEEE Trans. on Acoust., Speech, and Signal Processing* 37, pp. 862-871.

Churchill, R.V. (1960), *"Complex Variables and Applications,"* McGraw-Hill 2nd ed., pp. 273-275.

Guo, Z. et al. (1994), "The Time-Frequency Distributions of Nonstationary Signals Based on a Bessel Kernel," *IEEE Trans. on Signal Proc* 42, pp. 1700-1707.

Kaiser, J. et al. (1979), IIR Filter Design and Synthesis, *"Programs for Digital Signal Processing,"* New York: IEEE Press, DSP Committee, ed., Chapter 6.

Lang, W.C. et al. (1998), "Time-Frequency Analysis With the Continuous Wavelet Transform," *Am. J. Phys.* 66, pp. 794-797.

MacGregor, L.M. et al. (1998), "The RAMESSES Experiment-III. Controlled-source Electromagnetic Sounding of the Reykjanes Ridge at 57°45' N," *Geophys. J Int.* 135, pp. 773-789.

MacNae, J.C. et al. (1984), "Noise Processing techniques for time-domain EM systems," *Geophysics* 49, pp. 934-948.

McClellan, J. et al. (1979), "FIR Filter Design and Synthesis," *Programs for Digital Signal Processing*, New York: IEEE Press, DSP Committee, ed., Chapter 5.

Mitsuhata, Y. et al. (2001) "The Fourier Transform of Controlled-Source Time-Domain Electromagnetic Data by Smooth Spectrum Inversion," *Geophys. J. Int.* 144, pp. 123-135.

Olsen, K. et al. (1991), "Adaptive Noise Cancellation for Time-domain EM Data," *Geophysics* 57, pp. 466-469.

Press, W.H. et al. (1992), *"Numerical Recipes in Fortran,"* 2nd ed., Cambridge University Press, pp. 545-552.

Selesnick, I.W. et al. (1996), "Generalized Digital Butterworth Filter Design," *Proceedings of the IEEE International Conference on Acoustics, Speech, and Signal Processing* 3, pp. 1367-1370.

Sheriff, R. (2002) *"Encyclopedic Dictionary of Applied Geophysics,"* Society of Exploration Geophysicists, 4th ed., pp. 67, 138-139, 171.

Spies, B.R. (1988) "Local noise prediction filtering for central induction transient electromagnetic sounding," *Geophysics* 53, pp. 1068-1079.

Wigner, E. (1932) "On the Quantum Correction for Thermodynamic Equilibrium," *Phys. Rev.* 40, pp. 749-759.

Ville, J. (1948), "Theorie et application de la notion de signal analytique," *Cables et Transmission*, 2A, pp. 61-74.

(2001), *"MATLAB, the Language of Technical Computing,"* The MathWorks, Inc., pp. 2-85-2-86.

(2000), *"Signal Processing Toolbox User's Guide,"* The MathWorks, Inc., third printing, pp. 2-5-2-23.

*European Search Report*, RS 113729, Jul. 6, 2006, 1 page.

*International Search Report*, PCT/US06/44307, Mar. 30, 2007, 1 page.

\* cited by examiner

METHOD FOR SPATIAL FILTERING OF ELECTROMAGNETIC SURVEY DATA

CROSS-REFERENCE TO RELATED APPLICATIONS

This application is a continuation of U.S. application Ser. No. 12/087,371, filed 2 Jul. 2008, now U.S. Pat. No. 8,090,539 which is the national stage of PCT/US2006/44307 that published as WO 2007/086993 and was filed on 15 Nov. 2006, which claims the benefit of U.S. Provisional Application No. 60/763,473, filed 30 Jan. 2006, each of which is incorporated herein by reference, in its entirety, for all purposes.

FIELD OF THE INVENTION

This invention relates generally to the field of geophysical prospecting and more particularly to controlled source electromagnetic prospecting for hydrocarbons. Specifically, the invention is a method for spatial filtering of the data obtained in an electromagnetic survey using a controlled electromagnetic source.

BACKGROUND OF THE INVENTION

Controlled-source electromagnetic ("CSEM") surveys are an important geophysical tool for evaluating the presence of hydrocarbon-bearing strata within the earth. CSEM surveys typically record the electromagnetic signal induced in the earth by a source (transmitter) and measured at one or more receivers. The behavior of this signal as a function of transmitter location, frequency, and separation (offset) between transmitter and receiver can be diagnostic of rock properties associated with the presence or absence of hydrocarbons. A notable diagnostic rock property of this kind is electrical resistivity. Thus, CSEM measurements are typically used to determine the spatially-varying resistivity of the subsurface.

In the marine environment, CSEM data are typically acquired by towing an electric dipole transmitting antenna 10 among a number of receivers 11 positioned on the seafloor 12 (FIG. 1). The receivers typically have multiple sensors designed to record different vector components of the electric and/or magnetic fields. The transmitter antenna is typically towed (by a vessel on the sea surface 13) a few tens of meters above the seafloor. The receivers are weighted and fall to the seafloor, but release their weight and rise back to the surface with the data after receiving an acoustic command from the ship. Alternative configurations include stationary transmitters on the seafloor or in the water column as well as magnetic transmitter antennae. The transmitting and receiving systems typically operate independently (without any connection between them), so that receiver data must synchronized with shipboard measurements of transmitter position by comparing clock times on the receivers to time from a shipboard or GPS (Global Positioning System) standard.

CSEM data are typically interpreted in the temporal frequency domain, each signal representing the response of the earth to electromagnetic energy at that temporal frequency. Temporal frequency domain means the data is transformed, typically by Fourier transformation, such that the dependence of the data on time becomes dependence on frequency. In raw data, the strength of each frequency component varies depending on how much energy the transmitter broadcasts (i.e., the amplitude of each component in the transmitter's frequency spectrum) and on the receiver sensitivity at that frequency. These transmitter and receiver effects are typically removed from the data prior to interpretation. FIGS. 2A-B depict raw receiver data 21 together with the transmitter waveform 22 that gave rise to it. FIG. 2A displays measured data on a time scale of several hours while FIG. 2B shows the received signal (and, for reference, the transmitted signal) on a much shorter time scale, comparable to the transmitter signal period, typically between 4 and 32 seconds. (The vertical scale applies only to the receiver signal.)

In practice, the receiver data are usually converted to temporal frequency by dividing (or "binning") the recorded time-domain data into time intervals ($x_1$, $x_2$, and $x_3$ in FIG. 3A) equal to the transmitter waveform period (FIG. 3A) and determining the spectrum within each bin by standard methods based on the Fourier transform (FIG. 3B). (The phases of the spectral components are not shown.) With each bin is associated a time, typically the Julian date at the center of the bin. Since the transmitter location is known as a function of time, these bins may be interchangeably labeled in several different ways: by Julian date of the bin center; by transmitter position; by the signed offset distance between source and receiver; or, by the cumulative distance traveled by the transmitter relative to some arbitrarily chosen starting point.

In general, the received signals are made up of components both in-phase and out-of-phase with the transmitter signal. The signals are therefore conveniently represented as complex numbers in either rectangular (real-imaginary) or polar (amplitude-phase) form.

The transmitter signal may be a more complex waveform than that depicted in FIGS. 2B and 3A.

The magnitude of the measured electric field falls off rapidly with increasing source-receiver offset (FIG. 4A). When the offset is large enough, the earth's response to the transmitted signal will be weak and the measured signal will be corrupted by noise. Noise is a limiting factor in applying CSEM surveys to hydrocarbon exploration because it obscures the response from subtle earth structures, interferes with the use of data from multiple receivers, and restricts the range of temporal frequencies that can be used.

While some types of noise can be overcome by increasing transmitter strength or slowing the speed of the survey vessel, both approaches are costly. It is therefore advantageous to use computer-based signal processing techniques to mitigate noise in CSEM data.

When the origin of the noise is known precisely, it can sometimes be removed by explicit modeling and subtraction, as PCT Patent Publication No. WO2005/010320 published on Feb. 3, 2005, discloses for the case of air-wave noise. In other cases, where the origin of the noise is less well understood or where it may originate in more than one phenomenon, suppression methods can be based on how the noise presents itself in the data. For example, PCT Patent Publication No. WO2006/088591 published on Aug. 24, 2006, describes a method where noise is estimated from signals measured at frequencies that were not transmitted by the source.

FIGS. 4A and 4B depict electric-field data (amplitude data in FIG. 4A, phase data in FIG. 4B) containing noise that can be mitigated by this invention. The vertical axis in FIG. 4A is magnitude of the electric field normalized by the transmitter strength. The transmitter traveled about 59 km during the 0.9 days covered by the horizontal axis. The transmitter approaches the receiver from the left, passes nearest to the receiver at about day 184.95, and recedes from the receiver to the right. Each data point represents the electric field amplitude at 0.0625 Hz. computed from a 32-second bin which is equivalent to about 24 meters of transmitter movement for this survey. The large signal fluctuations before day 184.85 and after day 185.51 cannot be physically attributed to variations in the subsurface resistivity, which is unchanging over such short time intervals. These fluctuations can only be noise.

The location of the transmitter antenna 10 as a function of time is recorded during the course of the CSEM survey. As a result, there is no confusion regardless of whether the CSEM data are considered as a function of time, as is the case for the horizontal axis shown in FIGS. 4A-B, or as a function of source-receiver offset. In either view, fluctuations which occur too rapidly (in either offset or time) may be properly considered to be noise. Although offset is more commonly used as the independent variable, time is a more convenient choice in the case where the transmitter antenna is held at a fixed location for an extended period of time. In particular, when the transmitter antenna is held fixed, it may be desirable to remove rapidly-varying noise by means of the present invention prior to assigning an offset to the data.

Those skilled in the art of digital signal processing will know of techniques that will decompose time series, such as raw CSEM data, to temporal frequency without explicitly dividing the data into non-overlapping time intervals. In general, a time series may be transformed to the time-frequency domain and the dominant temporal frequencies extracted separately as functions of time. Some methods of transforming data to the time-frequency domain include the Short-Time Fourier Transform (J. Allen, L. Rabiner, "A Unified Approach to Short-Time Fourier Analysis and Synthesis," *Proc. of the IEEE* 65, 1558-64 (1977)); the Wavelet Transform (W. C. Lang and K. Forinash, "Time-frequency analysis with the continous wavelet transform," *Am. J. Phys.* 66, 794-797 (1998)); the Wigner-Ville transform (E. Wigner, On the quantum correction for thermodynamic equilibrium, Phys. Rev. 40, 749-759 (1932), and J. Ville, "Theorie et application de la notion de signal analytique," *Cables et Transmission,* 2A., 61-74 (1948)); the Choi-Williams transform (H. Choi and W. Williams, "Improved time-frequency representation of multicomponent signals using exponential kernels," *IEEE Trans. on Acoust., Speech, and Signal Processing* 37, 862-871 (1989)); and the Bessel method (Z. Guo, L. G. Durand, and H. C. Lee, "The time-frequency distributions of nonstationary signals based on a Bessel kernel," *IEEE Trans. on Signal Proc.* 42, 1700-1707 (1994)). The present invention is not limited to any particular method or methods for spectral decomposition of CSEM data to the temporal frequency domain.

The decomposition to temporal frequency indicated in FIG. 3B is itself a noise-rejection method since it suppresses those portions of the signal that do not correspond to frequencies that were broadcast by the transmitter.

A direct approach to mitigating rapidly-varying noise is to "stack" the data by combining several adjacent time bins into a single, larger bin. See, for example, L. M. MacGregor et al., "The RAMESSES Experiment-III. Controlled-source Electromagnetic Sounding of the Reykjanes Ridge at 57° 45' N," *Geophys. J. Int.* 135, 773-789 (1998). The use of weighted stacks has been discussed by Macnae, et al. for time-domain surveys (*Geophysics* 49, 934-948 (1984)).

Mitsuhata et al. ("The Fourier Transform of Controlled-Source Time-Domain Electromagnetic Data by Smooth Spectrum Inversion," *Geophys. J. Int.* 144, 123-135 (2001)) teach a method to estimate the Fourier transform of time domain data using least-squares inversion with a smoothness constraint. An objective is to compute at logarithmically-spaced values the frequency spectrum of time-domain measurements. The authors assume that the frequency-domain amplitudes and phases are smoothly varying with errors stemming from noise in the time-domain data. They further assume that both these errors and the errors in the original data follow Gaussian distributions whose widths are characterized by parameters they refer to as hyperparameters. Accordingly, they perform a least-squares fit of the measurements to sine and cosine waveforms at the logarithmically-spaced frequencies, at the same time fitting the constraints imposed by causality (that the measurements may not occur in time prior to the signal that generates them) and fitting the Gaussian distribution assumptions. As a final step, the hyperparameters are adjusted to minimize the error in these fits.

Spies estimates the noise on one component of the magnetic field from measurements on the other two components (*Geophysics* 53, 1068-1079 (1988)).

Spatial filters have been applied to reduce noise in aeromagnetic data, which are airborne measurements of the naturally occurring, static (zero-frequency) magnetic field of the earth. See, for example, B. K. Bhattacharyya, "Design of spatial filters and their application to high-resolution aeromagnetic data," *Geophysics* 37, 68-91 (1972).

The behavior and origin of noise in marine CSEM surveys can vary significantly from place-to-place in the earth and with changes in ocean currents and atmospheric conditions. Moreover, the noises in any particular CSEM data set may stem from more than one source and exhibit more than one type of behavior. It is therefore desirable that any CSEM noise suppression technique can be applied together with other noise-rejection techniques, such as decomposition to temporal frequency and stacking.

Stacking is a statistical process is most effective when the noise has a Gaussian distribution about some mean value. In marine CSEM data, the noise can have very large excursions from its mean value. As a result, larger stacking bins will tend to be dominated by a few of the largest noise spikes and can fail to represent the underlying signal. In addition, large stacking bins decrease the spatial resolution of the data, since it becomes unclear how large bins should be associated with a specific time or offset. Spatial resolution is important since the user of CSEM data is attempting to determine both the resistive nature and position of strata in the subsurface.

On land, most noise-suppression methods deal only with data acquired during time periods when the transmitter current is off. This strategy is crucial for land data since it provides a way of rejecting the very large signal that reaches the receiver through air (the "air wave"). The air wave is typically rejected by restricting the data analysis to time intervals where no energy is traveling through the air. In some land surveys and all marine surveys, data are acquired in the time domain, but the source consists of a repetitive waveform such as that shown in FIG. 2. Such repetitive waveforms are dominated by a small number of frequencies (perhaps 10, but as few as one) and are typically analyzed by binning the data at the waveform period and then transforming the data within each bin to frequency—as outlined above. In the marine setting, the air-wave is often suppressed by ohmic losses in the water. In addition, by keeping the transmitter mostly in an "on" state, marine surveys can operate at increased signal levels and spread more energy out among different temporal frequencies to better resolve the earth's structure in depth.

SUMMARY OF THE INVENTION

In one embodiment, the invention may be described with reference to the flow chart of FIG. 13 as a method for removing noise from data measured in a controlled source electromagnetic survey of a subterranean region, comprising (a) obtaining a temporal frequency component from the data, said temporal frequency being selected from said controlled source's frequency spectrum (step 132); (b) selecting a cutoff frequency, $f_{Cutoff}$, said cutoff frequency being selected to differentiate sharply varying response, inconsistent with the source's signal and earth resistivity, from gradually varying response (step 133); and (c) applying a low-pass filter to said temporal frequency component of said data, said low-pass filter being designed to suppress frequencies above said cutoff frequency, generating thereby a sequence of filtered data values (step 134). In another embodiment, the temporal frequency data component is obtained by first binning the CSEM survey data, then transforming the data to the temporal frequency domain, bin by bin (step 131).

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

The present invention is a method for suppressing noise in CSEM data based on the frequency content of the noise. The present invention recognizes that some data variations across bins cannot be attributed to resistivity variations within the earth. This variation across bins constitutes a model of noise in CSEM surveys, and the invention mitigates noises that obey this model.

Although frequent reference will be made in the following to spatial filtering and to filtering data in the spatial frequency domain, this is for illustrative purposes. The present inventive concept of removing rapidly varying noise by filtering shall be understood to apply equally well to data that do not represent a change in spatial coordinate (such as offset). For example, the invention is applicable to data acquired over a period of time by source and receiver whose relative offset does not change. Most generally, noise may vary rapidly in space or in time. In the following, therefore, terms such as "spatial frequency", "spatial filtering", and "offset" can be replaced by "frequency", "filtering", and "time" whenever the noise is known to vary too rapidly in data collection time to be attributed to either resistivity variations within the earth or to the variations in the source signal.

Figure 5:
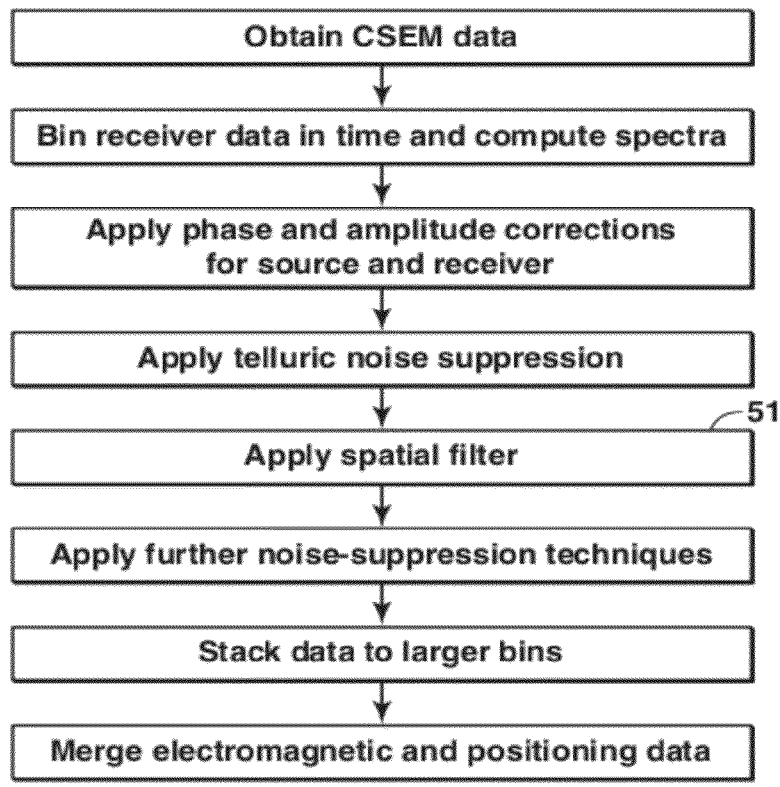
FIG. 5 is a flow chart showing one possibility for inserting the present invention into a typical series of steps for processing CSEM data.

Spatial filtering is performed in the present invention to remove portions of CSEM data that vary too rapidly in offset to be a legitimate response of the earth to the transmitted signal. The invention's various embodiments include several ways of performing spatial filtering (FIR, IIR, Fourier Transform-based filters) so that the CSEM data processor may select the particular spatial filtering that is most effective on a particular data set by contrasting the effectiveness of alternative implementations. Examples have been found where it was advantageous to apply the invention a second time, using a different type of spatial filtering FIG. 5 shows where the present inventive method (step 51) might be inserted into a generalized, typical processing flow for CSEM data. Those skilled in the art of CSEM data processing will recognize that the steps within a processing flow are always selected to meet the needs of a particular survey or data set and that those steps may be sequenced differently or different steps performed than shown in FIG. 5. This is particularly true in the case of the present invention, which requires only that spatial filtering be performed at some (at least one) point during the data processing. Other common processing steps, such as receiver orientation analysis and inversion, are not shown.

Filters are typically described as low-pass, high-pass, or band-pass depending upon whether they reject data at high frequencies, low frequencies, or frequencies outside of some range. Low-pass filters are appropriate for rejecting noises in CSEM data.

Finite Impulse Response ("FIR") Filtering

Figure 6:
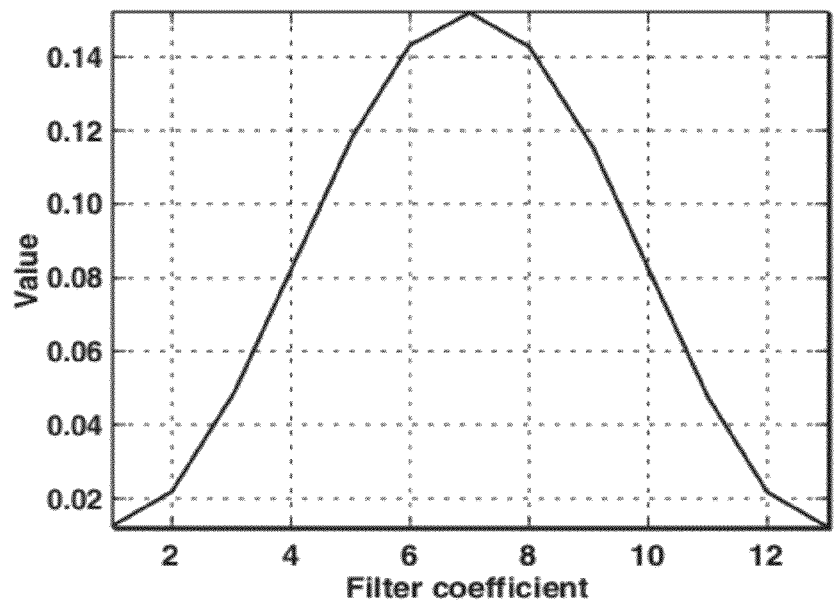
FIG. 6 shows an example of a convolutional filter to accept data that vary slowly in space and to reject data that vary rapidly in space.

In this method, the data are convolved (in the offset or Julian date domain) with a linear operator such as that shown in FIG. 6. This operator is an example of a convolutional filter to accept data that vary slowly in space (equivalent to low frequencies, long periods, and large numbers of time bins) and to reject data that vary rapidly in space (equivalent to high frequencies, short periods, and small numbers of time bins). This filter is 12 bins long and was designed using a Hamming window.

Figure 4A:
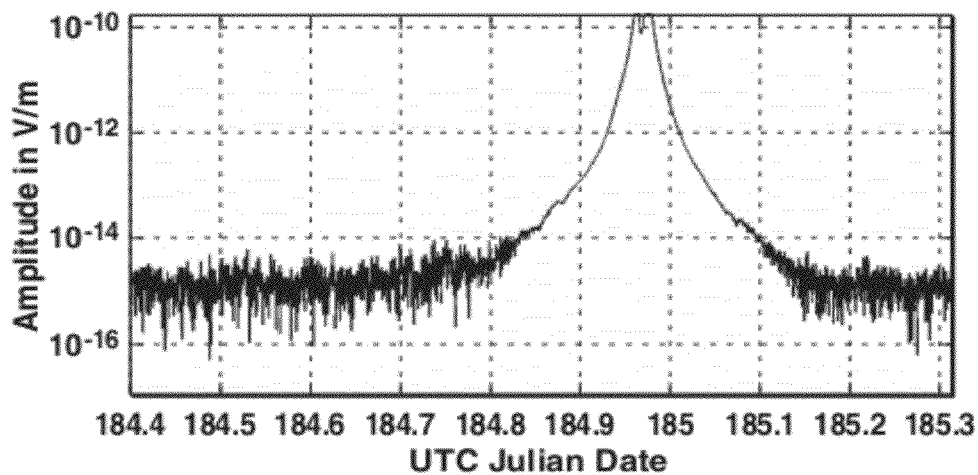
FIG. 4A shows electric field amplitude data from a CSEM survey where the data contain high frequency noise when the transmitter is far away from the receiver.
Figure 4B:
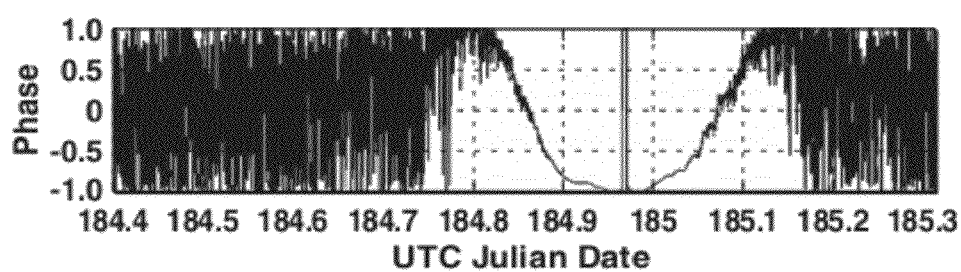
FIG. 4B shows the corresponding phase data.
Figure 7A:
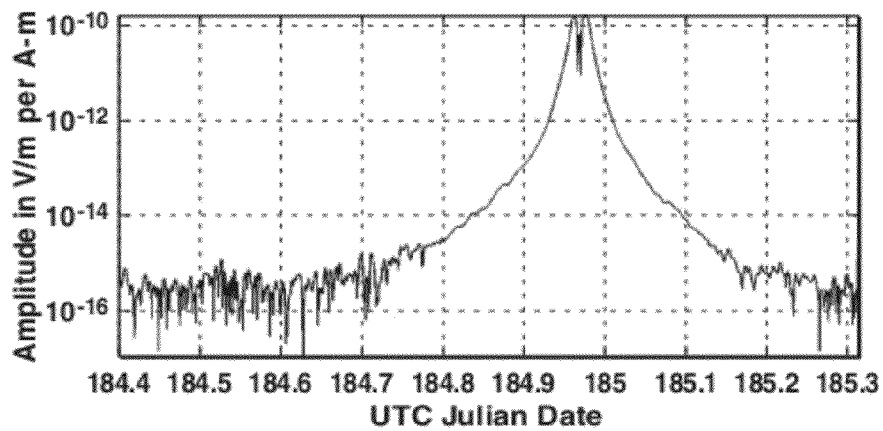
FIGS. 7A and 7B show the data in FIG. 4 after convolutional filtering with the operator shown in FIG. 6.
Figure 7B:
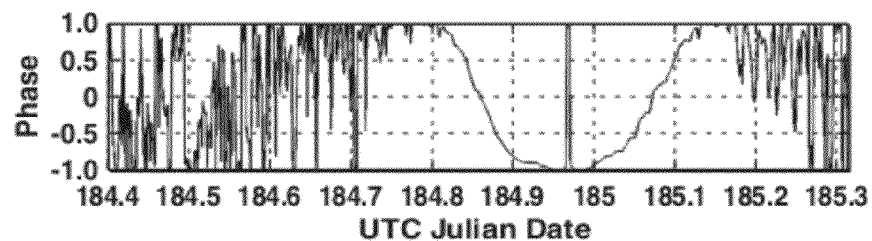

The application of convolutional operators is a known geophysical method (R. Sheriff, *Encyclopedic Dictionary of Applied Geophysics*, Society of Exploration Geophysicists, 4th ed. (2002); Sheriff also defines the Hamming window) and FIR filter techniques have found extensive application in the signal processing literature (*Programs for Digital Signal Processing*, IEEE Press (1979)). FIGS. 7A and 7B are the result of applying the filter to the data in FIGS. 4A and 4B, FIG. 7A showing amplitude and FIG. 7B phase. These plots show that the rapid fluctuations between days 184.75 and 184.85 and between days 185.1 and 185.2 have been suppressed, leaving a more accurate representation of the earth response. In the saturation zone (between days 184.95 and 184.97), the transmitted signal was too strong to be accurately recorded by the receiver, and the filter has no relevant effect. In the very-high noise regions before about day 184.75 and after about day 185.2, the signal is too weak to be recovered by the invention.

An FIR convolution operator may be written mathematically as $$y_n = \sum_{k=0}^{M} c_k x_{n-k} \quad (1)$$

where the x-values are the input data, c the filter coefficients, and y the filtered output. The filter length is M, the filter having M+1 coefficients. In this expression, x-values from several bins are combined to form a filtered y-value at a single bin. A filter coefficient, $c_k$, is not associated with a particular bin. Instead, the $c_k$ serve to weight different x-values depending upon which output value is to be constructed. FIG. 6 shows filter coefficient values for a typical convolutional filter.

Those skilled in the art of digital filtering will appreciate that equation (1) is written in a form that is most natural for real-time applications. That is, if the variables n and k index into data that are sampled regularly in time, then equation (1) predicts the filtered signal y from values of x taken at earlier times. Furthermore, filters described by equation (1) will in general introduce a shift in the output filtered data relative to the input. For example, the filter shown in FIG. 6 is largest in the neighborhood of k=(M+1)/2, so that the output signal $y_n$ at bin n will be dominated by input signal values at earlier times (or prior spatial positions) in the neighborhood of $x_{n-(M+1)/2}$, the data at bin n-(M+1)/2. For CSEM data, a spatial filter could be applied as the data are acquired according to equation (1). Alternatively, the filter could be applied after all of the data have become known, in which case it would be convenient to write the filter as $$y_n = \sum_{k=-(M+1)/2}^{(M+1)/2} c_k x_{n-k}, \quad M \text{ odd} \quad (2)$$

$$= \sum_{k=-M/2}^{M/2} c_k x_{n-k}, \quad M \text{ even}$$

In this form, the filter need not introduce a shift in the output data relative to the input. If the filter in equation (1) is a linear phase filter (that is, if it introduces a phase shift that is the same for all of the spectral components in a Fourier decomposition of the data), then it is possible to remove that shift by simply shifting the output sequence, $y_n$. For example, the filter shown in FIG. 6. will delay the output signal by 6 points relative to the input. In the simplest situation, the phase shift introduced by equation (2) can be zero. In general, the conditions under which the coefficients $c_k$ will introduce no shift or a simple linear phase shift are known (see Chapter 5 of *Programs for Digital Signal Processing*). Filters that are not linear phase will be discussed below in conjunction with IIR filters.

It will also be appreciated that, if the number of output data values must be the same as the number of input values, then filter definitions such as equations (1) and (2) must be supplemented with prescriptions of how to handle the extreme cases of the largest or smallest values of n. Otherwise, equation (1) would be undefined for n<M. By far the simplest prescription is to define additional values of x as needed, for example, by declaring them to be zero or by extrapolating additional x-values outside the range of known data.

Chapter 5 of *Programs for Digital Signal Processing* discusses how to design low-pass FIR filters using the windowing method. The user must specify (1) the cutoff frequency, (2) the length of the filter operator in samples, and (3) the type of window used to restrict the filter operator to a finite length, as opposed to an idealized, infinite-length filter. Since noise will differ among CSEM data sets, the most important criteria for selecting these parameters are by visual inspection of their impact on the data. In general:

The cutoff frequency, $f_{Cutoff}$, divides those variations that are generally passed by the low-pass filter from those that are generally rejected. The highest spatial frequency that can be represented in CSEM data is the Nyquist frequency, $f_{Nyquist}$, which is equal to one-half the spatial sampling frequency. In the data of FIGS. 4A-B, the bin size of 32 seconds corresponds to a spatial sampling interval of 24 m. in offset distance. Thus, the spatial sampling frequency is $1/24$ m$^{-1}$≈0.04167 m$^{-1}$ and $f_{Nyquist}=1/48$ m$^{-1}$≈0.0208 m$^{-1}$. Spatial frequencies higher than $1/48$ m$^{-1}$ will not be adequately represented by the 24 m. sampling interval in these data and are said to be aliased. The cutoff frequency is preferably chosen as a fraction of $f_{Nyquist}$ small enough to reject high-frequency noise in the data and large enough to retain low-frequency (or long-period) signal. In the example of FIGS. 7A-B, $f_{Cutoff}$ is 0.48% of $f_{Nyquist}$. The particular choice of $f_{Cutoff}$ manifests itself in the slope of the filter coefficient, $c_k$, shown in FIG. 6. The filter in FIG. 6 includes 13 coefficients and therefore has a length of M=12. The horizontal axis of FIG. 6 is simply an enumeration of the filter coefficients. However, when the filter is applied to a particular data set, the horizontal interval between filter points becomes the sample rate of the data: 24 m. in the case of FIGS. 4A-B. As the sides of the filter become steeper, the filtered data are clearly more dominated by the single data value at the center of the filter. Equivalently, the filter has less impact as $f_{Cutoff}$ moves toward $f_{Nyquist}$ and fewer spatial frequencies are rejected. In the limit where $f_{Cutoff}=f_{Nyquist}$, the filter becomes a single point with $c_1=1$.

The choice of filter length is controlled by several factors. For many types of data, longer filters can more completely reject data above $f_{Cutoff}$ with less amplitude distortion than can shorter filters. Unfortunately, CSEM data vary exponentially with offset, the electric field changing by perhaps an order of magnitude in 3 km. As a result, it is often necessary to restrict filter lengths to a distance over which the signal amplitude does not vary significantly, for example 10% of one skin depth. A typical filter length for CSEM data is in the neighborhood of 300 m. The number of filter points, M+1, which span this distance depends on the spatial sampling of the data (the bin size) which, in turn, depends on the temporal frequency of the data and the speed of the transmitter tow vessel. Most generally, the number of filter points would often be limited by $$M \leq 0.1 \frac{\delta f}{v} \quad (3)$$

where v is the vessel speed in msec, f is the temporal frequency in Hz., and $\delta = \sqrt{1/f\pi\mu\sigma}$ is the skin depth at an average earth conductivity of G. In the expression for skin depth, $\sigma$ is measured in $(ohm-m)^{-1}$ and $\mu = 4\pi \times 10^{-7}$ Henry/m. For a typical marine vessel speed of 0.75 m/s and earth conductivity of 1 $(ohm-m)^{-1}$, 1/32 Hz. data would be limited to $M \leq 12$ while ½ Hz. data would be limited to $M \leq 47$. For stationary sources (v~0), M can be very large and is only limited by the number of available data points. Although vessel-towed sources are most prevalent in CSEM exploration, the present invention can also be applied, for example, to land operations using airborne sources. Thus, in general, v is the source speed.

The window type is the least important parameter—see W. H. Press, et al., *Numerical Recipes in Fortran*, 2nd ed., Cambridge University Press (1992). The choice of window type determines how the finite-length filter will operate in its pass and reject bands. A rectangular window, for example, results in small amplitude variations in the pass band, which in turn introduce small amplitude errors at some spatial frequencies in the filtered data. By contrast, a Hanning window reduces those amplitude errors at the expense of broadening the transition between passed frequencies and rejected frequencies. In addition to these window types, many others have been defined in the literature: triangular, Hanning, Kaiser, Chebyshev, Welch, Blackmann, Barlett, and Hann, to name a few. Each of these window types strikes a different balance among the needs to (1) minimize the amplitude fluctuations within the pass band, (2) maximize the noise rejection above $f_{Cutoff}$, and (3) enforce a sharp transition between the pass band and stop band. Experience shows that the impact of different windows is typically small for CSEM data. A Hanning window was used in FIGS. 6, 7A-B, and 8A-B.

Figure 8A:
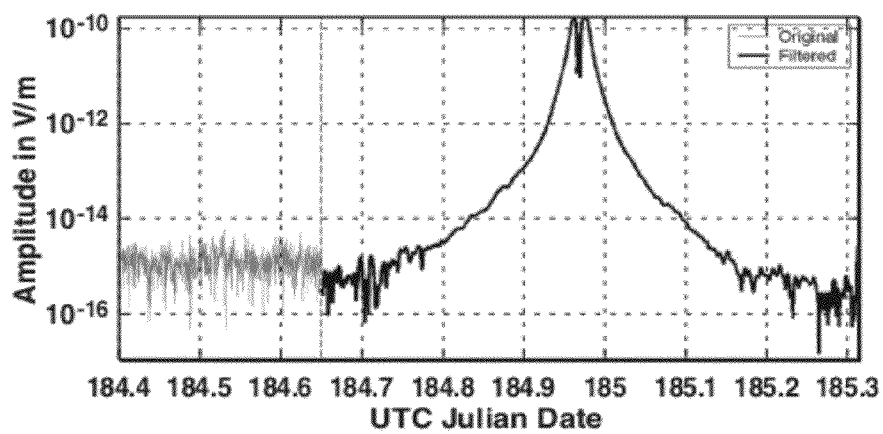
FIGS. 8A and 8B show the filtered data from FIGS. 7A and 7B adjacent to the unfiltered data from FIG. 4.
Figure 8B:
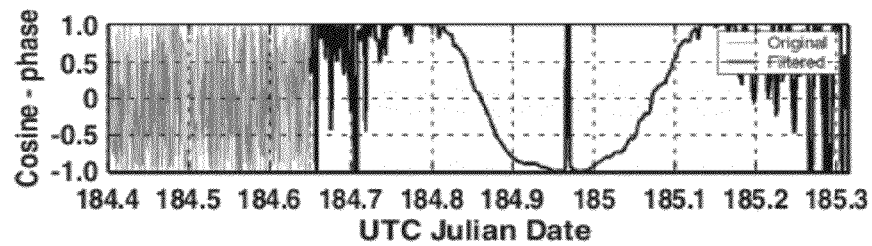

FIGS. 8A-B highlight the impact of spatial filtering by interleaving the original data from FIGS. 4A-B with the filtered data from FIGS. 7A-B. The unfiltered data appear to the left prior to day 184.65 while the filtered data appear to the right of day 184.65.

Beyond the windowing method, other techniques for designing FIR filters are known and appropriate for use on CSEM data. These include the Remez Exchange Algorithm (*Programs for Digital Signal Processing*, chapter 5) and the Constrained Least Squares method (*Signal Processing Toolbox User's Guide*, The MathWorks, Inc., third printing, (2000)).

In contrast to the Fourier Transform-based implementation described below, both FIR filters and IIR filters (also described below) are particularly useful because they can be applied directly to the complex-valued data (resulting from transformation from the time domain to the temporal frequency domain), thereby preserving the phase of the data.

Figure 3A:
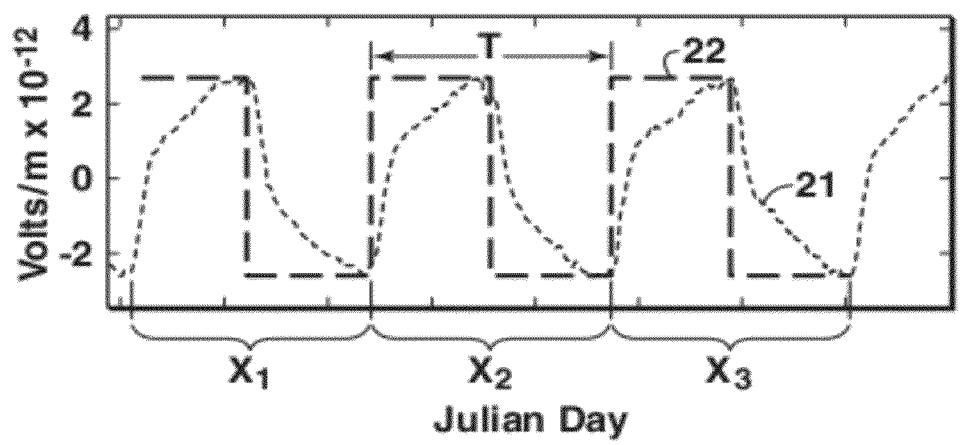
FIGS. 3A and 3B illustrate the process of binning a receiver signal in time and determining the frequency spectrum within each time bin by Fourier analysis.
Figure 3B:
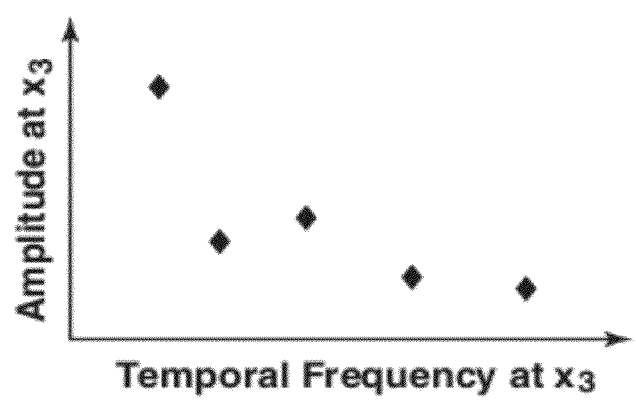
Figure 9:
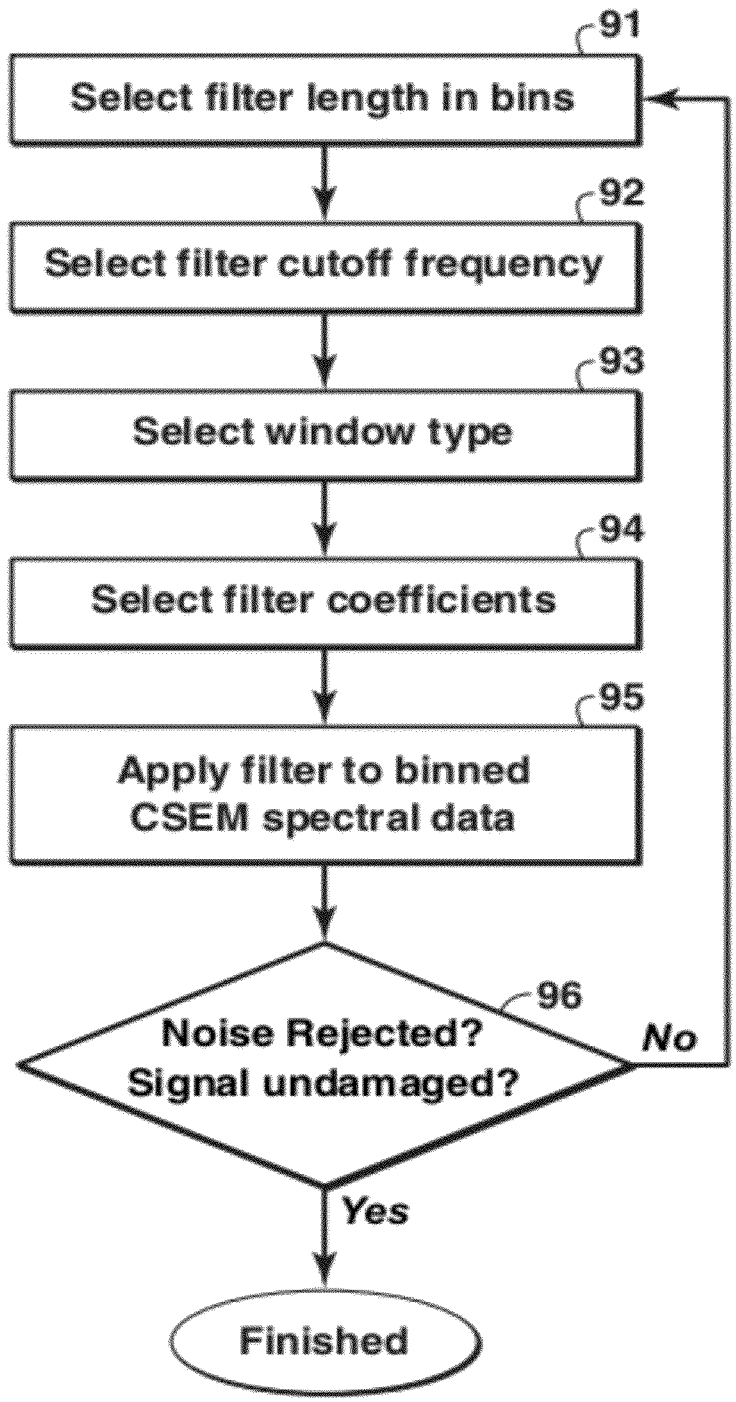
FIG. 9 is a flowchart showing steps in applying a spatial filter to binned CSEM spectral data.

Steps in the design and application of an FIR spatial filter are summarized in the flowchart of FIG. 9. At step 91, the filter length is selected in units of bins (see FIGS. 3A-B). Selecting the filter cutoff frequency is step 92. In typical operation using CSEM data with a fundamental frequency between 1/32 and 1/4 Hz, filter lengths might range from 8 to 64 bins, and cutoff frequencies lie below 10% of $f_{Nyquist}$. For the filter of FIG. 6, the filter length is 12 bins and the filter cutoff frequency is 0.48% of $f_{Nyquist}$. At step 93, a window type is selected. In the example (FIG. 6), a Hamming window was used. The filter coefficients are created at step 94. This step generates the values that are plotted in FIG. 6. The filter is then applied in step 95 to binned CSEM spectral (meaning frequency domain) data (see FIGS. 3A-B). If the filtered data still exhibit excessive noise or the signal has been damaged, an alternate filter can be designed and applied to the unfiltered data (step 96). Alternatively, a second filter could be applied to data that has previously been filtered (data resulting from step 95), following the steps of FIG. 9 again except for the filter application being to the previously filtered data. Re-applying the same filter might be of some value in further rejecting spatial frequencies above $f_{Cutoff}$. However, a more likely scenario would be that the first filter application removes enough noise to make some less dominant noise more apparent. In this scenario, a second filter could be applied, with its own value of $f_{Cutoff}$, to mitigate the less dominant noise. In general, the ideal filter parameters will vary from data set to data set depending on the characteristics of the noise.

Infinite Impulse Response (IIR) Filtering

In this method, the data are passed through a recursive process in which the filtered data points are a sum of a convolutional filter acting on the unfiltered data plus another convolution acting on portions of the filtered data. Specifically, the IIR-filtered data points, $y_n$, are given in terms of the unfiltered data points, $x_n$, by $$y_n = \sum_{k=0}^{M} c_k x_{n-k} + \sum_{j=1}^{N} d_j y_{n-j} \quad (4)$$

Figure 10A:
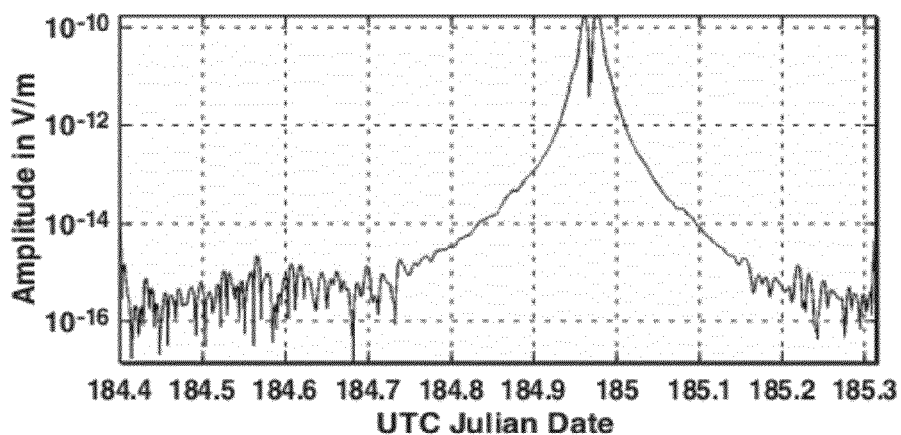
FIGS. 10A and 10B show the results of applying a spatial filter of the infinite impulse response type to the data in FIG. 4.
Figure 10B:
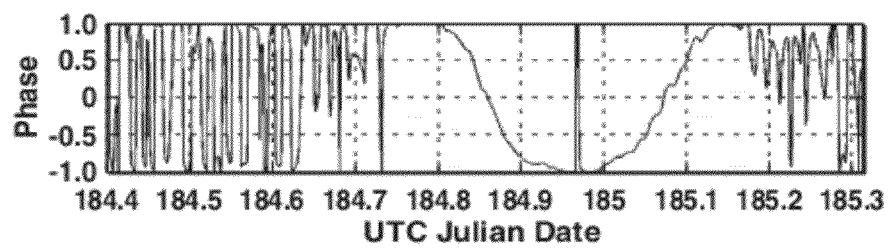
Figure 11A:
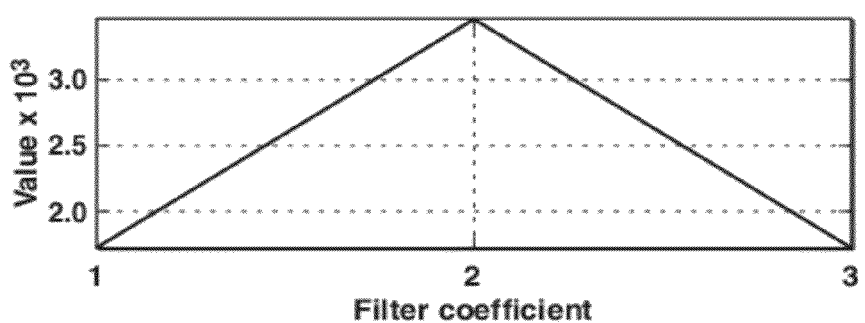
FIGS. 11A and 11B show an example of coefficients for an infinite-impulse response filter.
Figure 11B:
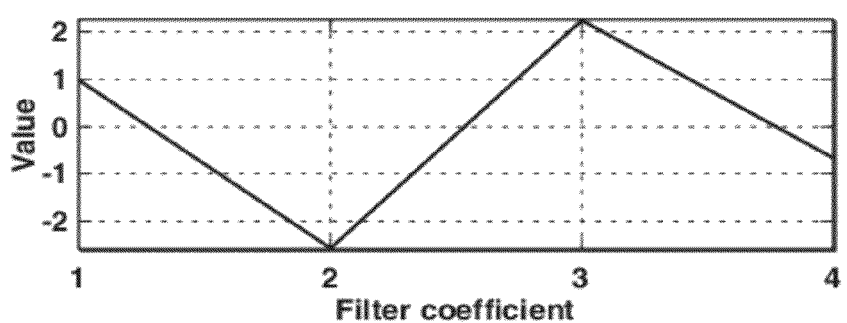

(*Numerical Recipes in Fortran*, p. 552). Note that the IIR filter described by equation (4) reduces to the FIR filter described by equation (1) in the limit N=0. Because of their more general form, IIR filters can more precisely duplicate the response of idealized filters with shorter filter lengths than FIR filters. As described above, shorter filter lengths are advantageous for CSEM data which vary exponentially with offset. FIGS. 10A and 10B show the impact of an IIR filter on the data of FIGS. 4A-B, with some improvement over the FIR filter in FIGS. 7A-B. This particular filter, based on the Generalized Butterworth method, gives a somewhat smoother result for the phase of the data than does the FIR filter in FIGS. 7A-B. Butterworth filters are discussed in I. W. Selesnick and C. S. Burrus, "Generalized Digital Butterworth Filter Design," *Proceedings of the IEEE International Conference on Acoustics, Speech, and Signal Processing* 3 (1996) as well as in Chapter 6 of *Programs for Digital Signal Processing*. Other IIR filter types discussed in the literature include Chebyshev Type 1, Chebyshev Type 2, Bessel, Elliptic, Prony, Steiglitz-McBride, and Yule-Walker filters. While FIR filters are known to be stable mathematical operators, it is known to be more difficult to design stable IIR filters. In addition to the stability criterion, IIR filter designs trade off the same criteria as do FIR filters, including minimal amplitude distortion in the pass bands or stop bands, sharpness of the filter transition around $f_{Cutoff}$, and minimum phase distortion at all (spatial) frequencies. The number of coefficients, N and M must be supplied along with $f_{Cutoff}$. In the example of FIGS. 10A-B, M=2, N=4, and $f_{Cutoff}$=6.5% of $f_{Nyquist}$. The filter coefficients used to produce the data in FIG. 10 are displayed in FIGS. 11A ($c_k$) and 11B ($d_j$). FIG. 11A shows the M+1=3 coefficients in the first term on the right hand side of equation (4), and FIG. 11B shows the N=4 coefficients in the second term.

In general, IIR filters can distort the phase of the data. That is, IIR (as well as certain FIR filters) can shift different spatial frequencies of the input data horizontally by differing amounts. For CSEM data, such a phase distortion would translate to a mispositioning of the filtered data in space and risk a corresponding misinterpretation of the subsurface resistivity values that give rise to the filtered data. In the example presented herein, the phase distortion problem was solved by applying the filter operator twice: once from left-to-right, filtering the high spatial frequencies and phase-shifting the data, and a second time, applying the reversed operator from right-to-left, thereby reversing the effects of the phase shift and applying some additional rejection of the high spatial frequencies. By way of example, the IIR filter described in equation (4) would be reversed and applied in the opposite direction as $$y_n = \sum_{k=0}^{M} c_k x_{n+k} + \sum_{j=1}^{N} d_j y_{n+j} \qquad (5)$$

The second term in equation (4) and in equation (5) defines a sense or preferred direction for the IIR filter. That is, the filtered data values, $y_n$, depend on previously filtered data either to the left or right of $y_n$. As a result, the alternative specification of the FIR filter described in equation (2) is not relevant to the IIR filter. Instead, the application of an IIR filter to CSEM data that are known in their entirety offers the possibility of applying equation (5) followed by equation (4). It is not possible to predict in advance the relative merit of applying equation (4) before or after equation (5) for a particular CSEM data set.

As with FIR filters, equations (4) and (5) must be supplemented with prescriptions of how to handle data at the farthest offsets from the receiver, the simplest being to pad zeroed or extrapolated data as needed.

Fourier Transform-based Filtering

A third approach to spatial filtering is based on transforming the data to the spatial frequency domain (usually by means of the Fast Fourier Transform or FFT), zeroing out the high spatial frequency components, and transforming the data back to the space (offset) domain. Specifically, having divided CSEM data acquired as time series into bins and, as in FIG. 3B, having extracted temporal frequency components for each bin and furthermore having organized any one of the temporal frequencies according to the source-receiver offset associated with each bin, as in FIGS. 4A-B, one may perform a Fourier Transform of the data at that temporal frequency and enumerated by bin from the spatial offset domain to the spatial frequency domain. As with the FIR and IIR filters, high spatial frequencies are identified with noise and may be zeroed or otherwise decreased prior to inverse Fourier transforming As an example, the data in FIGS. 4A-B consist of 2468 complex numbers, represented as amplitude and phase and covering a range of approximately 59 km in source-receiver offset. These data could equivalently be represented by real and imaginary parts. The interval between data points is 24 m. Because the transmitter was towed continuously during data acquisition, the interval between data points could alternatively be regarded as approximately 32 sec of time and the offset range regarded as covering approximately 0.9 days. Applying a Fourier Transform to the data of FIG. 4 will result another series of complex numbers representing spatial frequency components between approximately zero and $f_{Nyquist}$. In this spatial frequency domain, $f_{Nyquist}$ may be equivalently regarded as $0.5/24$ m$^{-1}$ or as $0.5/32$ sec$^{-1}$ without any confusion.

Figure 12A:
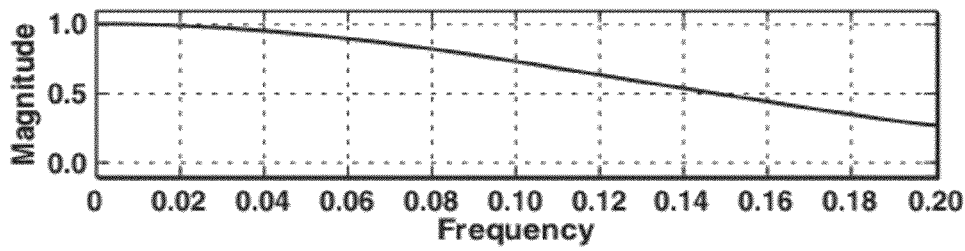
FIGS. 12A, 12B, and 12C compare different filter response functions.
Figure 12B:
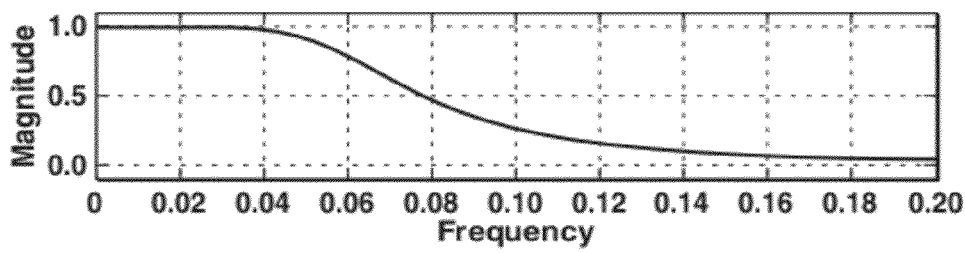

If x represents spatial offset, f the spatial frequency variable, D(f) the data in the spatial frequency domain, then the filtered data in the offset domain, $D_f(x)$, is given by the inverse Fourier transform $$D_f(x) = \frac{1}{\sqrt{2\pi}} \int_0^{f_{Nyquist}} H(f) D(f) e^{-2\pi i f x} df \qquad (6)$$

where H(f) is a function response function which is near 1 for low spatial frequencies and near 0 for high spatial frequencies. The FIR and IIR filters described in FIGS. 6 and 11A-B have equivalent response functions shown in FIGS. 12A and 12B, respectively. In these figures, the magnitude of H is shown along the vertical axis versus the spatial frequency as a fraction of $f_{Nyquist}$ along the horizontal axis.

Figure 12C:
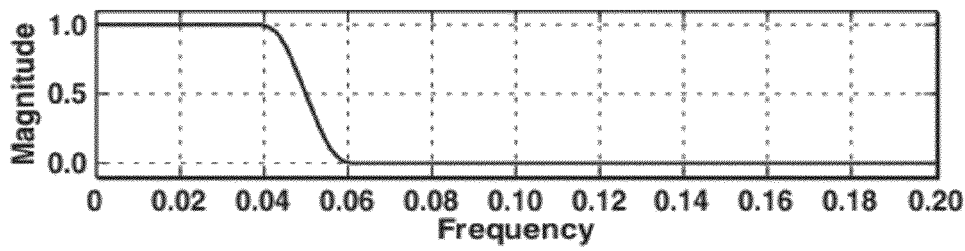
Figure 13:
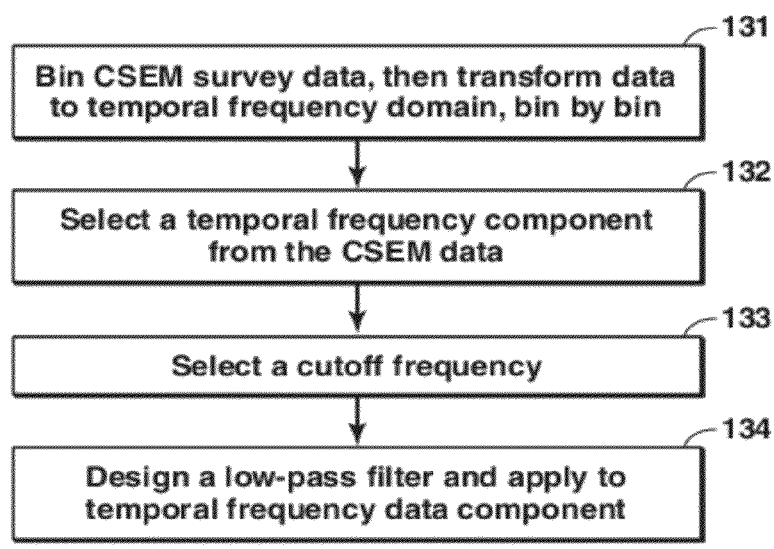
FIG. 13 is a flowchart showing steps in an embodiment of the invention.

In the Fourier Transform-based approach, the response function, H, can be specified directly in the spatial frequency domain as shown in FIG. 12C. A response function specified directly in this way will generally be characterized by (1) having a cutoff frequency, $f_{Cutoff}$, (2) being approximately 1 at frequencies below $f_{Cutoff}$, (3) being approximately 0 at frequencies above $f_{Cutoff}$, and (4) having a transition behavior between 1 and 0 for frequencies in the neighborhood of $f_{Cutoff}$. The transition between 1 and 0 may be handled in different ways. For example, a sharp transition:

$H(f)=1$, for $f \leq f_{Cutoff}$ $H(f)=0$, otherwise;

a linear taper $H(f) = 1,$ for $f \leq f_{Cutoff} - \Delta f$ $H(f) = \dfrac{f_{Cutoff} + \Delta f - f}{2\Delta f},$ for $f_{Cutoff} - \Delta f < f < f_{Cutoff} + \Delta f$ $H(f) = 0,$ otherwise;

and, a preferred approach depicted in FIG. 12C, a squared cosine bell $H(f) = 1,$ for $f \leq f_{Cutoff} - \Delta f$ $H(f) = \cos^2\left(\dfrac{\pi}{2} \dfrac{f - f_{Cutoff} + \Delta f}{2\Delta f}\right),$ for $f_{Cutoff} - \Delta f < f < f_{Cutoff} + \Delta f$ $H(f) = 0,$ otherwise.

In these formulae, $\Delta f$ specifies the width of the transition zone. Specifically, the transition zone extends over the frequency range from $f_{Cutoff} - \Delta f$ to $f_{Cutoff} + \Delta f$. As with $f_{Cutoff}$ itself, $\Delta f$ is best determined by its impact on a specific CSEM data set, although values of $\Delta f$ in the neighborhood of 0.1-0.4 times $f_{Cutoff}$ are frequently acceptable. It is well known to those familiar with Fourier Transforms that the filter response functions must be smoothly-varying in the Fourier domain to avoid introducing noise from the filtering operation itself.

Thus, response functions such as the squared cosine bell, whose derivatives are continuous at the edges of the transition zone, are preferred over response functions whose derivatives are not continuous at the edges, such as the linear taper or sharp transition.

The variation of CSEM data over several orders of magnitude causes a severe problem when attempting to filter data directly in the spatial frequency domain. Since the Fourier Transform is a global operation over the data and a numerical approximation, data values less than about 1/1000th of the peak value will be lost in numerical noise. In principle, the offset range of CSEM data could be divided into smaller, possibly overlapping ranges, in which the data variation is sufficiently small and a Fourier transform and filter applied separately to the data in each offset range. However, this method is undesirable due to the additional effort needed to determine the sub-ranges of offsets, perform separate Fourier transform and filtering operations on each sub-range, and ensure that the filtered sub-ranges joint together smoothly without introducing artifacts such as discontinuities or slope breaks into the overall filtered data sequence.

A preferred approach for a Fourier Transform-based filter is to first take the logarithm of the data, in order to reduce its variability to a range that is more acceptable for carrying out a Fourier transform. This method requires resolving an ambiguity over how best to define the logarithm of complex data (or, equivalently, of the negative data values). To handle the logarithm of data that are complex numbers, the data phase should, in principle, be followed as it unwraps onto different Riemann sheets (*Complex Variables and Applications*, R. V. Churchill, McGraw-Hill 2nd edition, pages 273-275 (1960)). Unfortunately, unwrapping the phase becomes numerically ambiguous precisely where the data become noisy—that is, at the same offset ranges where the phase is needed in order to carry out the Fourier Transform, filter off the high spatial frequencies, and recover the signal. In the preferred approach, the phase problem is addressed through the following procedure: the logarithm is taken assuming the data phase is exactly zero, the data are Fourier transformed, filtered, inverse-transformed, and exponentiated, and the original data phase is applied to the filtered output after exponentiation. While there is no rigorous mathematical justification for this approach, it has the effect of retaining the phase of "good" (i.e., noise-free) data points. Persons skilled in the art will have their own approaches to unwrapping the phase, or dealing with logarithms of complex numbers in general.

It is further appreciated by those familiar with the method of the Fast Fourier Transform, that Fourier transforms may be calculated most rapidly for data sequences whose lengths are the product of a small number of prime factors. Thus, zero values may freely added before or after the CSEM data to produce sequences of preferable length for FFT computer algorithms. Some examples of preferred lengths for the data in FIG. 4 containing 2468 points would be $2560=2^9 \times 5$ points, $3072=2^{10} \times 3$ points, $3200=2^7 \times 5^2$ points, and $4096=2^{12}$ points. Such insertion of zeros, termed zero padding, will not impact the operation of the spatial filter described in equation (6) provided the data values corresponding to the added zeros are removed or ignored following spatial filtering.

Preferably, the invention is embodied in the form of computer software used in conjunction with other computer software to carry out the steps shown in FIGS. 5 and 9. As with the other steps in FIGS. 5 and 9, the invention could also be implemented in electronic hardware or in some combination of hardware and software. The automated embodiments may provide one or more opportunities for human intervention.

Skilled practitioners of geophysical data processing will recognize the importance of testing multiple noise mitigation techniques, testing them in combination, and observing the impact of their control parameters by examining the impact on their data. Techniques to create digital filters are well published and commercially available as computer programming languages and libraries. (See, for example, *MATLAB, the Language of Technical Computing*, The MathWorks, Inc. (2001)) Consequently, the above description of the invention, together with the development or purchase of appropriate software, will enable a geophysical data processor to practice the invention. Optimal parameter choices for the FIR, IIR, and Fourier Transform methods are data-dependent and, so, cannot be specified in advance of the data processing.

Figure 1:
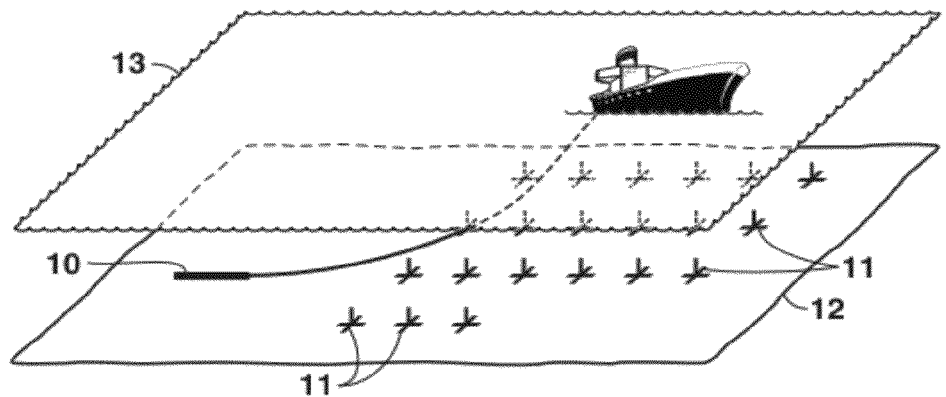
FIG. 1 illustrates deployment of equipment in a typical marine CSEM survey.
Figure 2A:
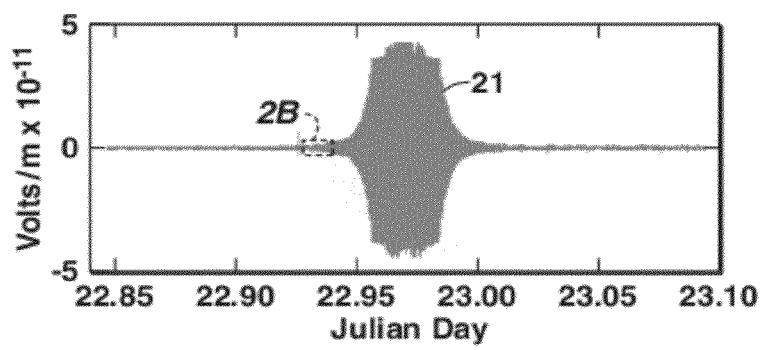
FIGS. 2A and 2B depict a received CSEM signal and the transmitter waveform that gave rise to it as functions of time.
Figure 2B:
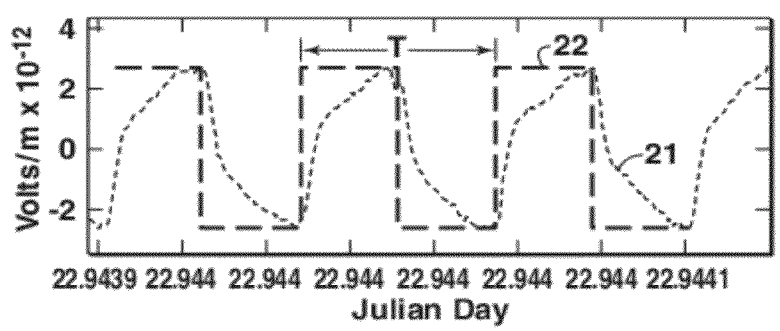

In addition, it will be obvious to those skilled in the art of geophysical data processing that the method can be applied to measurements of magnetic field components and to data generated by a transmitter that primarily introduces a magnetic field in the earth. (This is in contrast to the linear antenna depicted in FIG. 1, which primarily introduces an electric field in the earth. It is well known that any time-varying current will introduce both electric and magnetic fields in the earth and, furthermore, that linear antennae are primarily electric-field devices while loop-type antennae are primarily magnetic-field devices.)

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for removing noise from data measured in a controlled source electromagnetic survey of a subterranean region, comprising:
   a. obtaining a temporal frequency component from the data, said temporal frequency being selected from said controlled source's frequency spectrum;
   b. selecting a cutoff frequency, $f_{Cutoff}$, said cutoff frequency being selected to differentiate sharply varying response, inconsistent with the source's signal and earth resistivity, from gradually varying response;
   c. applying a low-pass filter to said temporal frequency component of said data, said low-pass filter being designed to suppress frequencies above said cutoff frequency; and
   d. generating thereby a sequence of filtered data values.

2. The method of claim 1, wherein the data are a time series, where time refers to data collection time, and wherein the data are transformed to time-frequency domain from which the temporal frequency component is extracted.

3. The method of claim 2, wherein:
   said sharply varying response and said gradually varying response refer to variation of said temporal frequency component as a function of data collection time; and
   said cutoff frequency corresponds to a temporal frequency with respect to data collection time.

4. The method of claim 2, wherein:
   said sharply varying response and said gradually varying response refer to variation of said temporal frequency component as a function of receiver-source separation; and
   said cutoff frequency corresponds to a spatial frequency with respect to receiver-source separation.

5. The method of claim 2, wherein said step of applying a low-pass filter comprises applying a convolutional operator to said temporal frequency component of the data.

6. The method of claim 5, wherein said convolutional operator is expressed mathematically as $$y_n = \sum_{k=0}^{M} c_k x_{n-k}$$

where index k refers to data collection time; M is a selected filter length (an integer number); $c_0, c_1, \ldots c_M$ are selected filter coefficients; $x_i$ is the value of said temporal frequency component for the $i^{th}$ data collection time; and $y_n$ is the filtered value for the $n^{th}$ data collection time.

7. The method of claim 6 wherein said source is moving at speed v meters/second during the survey, and said filter length M obeys the relationship $$M \leq 0.1 \frac{\delta f}{v}$$

where f is the selected temporal frequency in Hz., $\delta = \sqrt{1/f\pi\mu\sigma}$ is skin depth, $\sigma$ is average earth conductivity in $(\text{ohm-m})^{-1}$, and $\mu$ is $4\pi \times 10^{-7}$ Henry/m.

8. The method of claim 5, wherein said convolutional operator is a finite-impulse filter.

9. The method of claim 5, wherein said low-pass filter is designed by a windowing method, comprising:
 (a) selecting a filter length, M, corresponding to a number of data collection times;
 (b) selecting a window type, said window type serving to restrict the low-pass filter to the selected filter length, M; and
 (c) using the selected window, the filter length, and the cutoff frequency to determine M+1 filter coefficients.

10. The method of claim 2, wherein said step of applying a low-pass filter comprises applying a recursive process to said temporal frequency component of the data, said recursive process being mathematically expressible as $$y_n = \sum_{k=0}^{M} c_k x_{n-k} + \sum_{j=1}^{N} d_j y_{n-j}$$

where $c_k$ and $d_j$ are filter coefficients, M and N are selected filter lengths in bins, $x_i$ is the value of said temporal frequency component for the $i^{th}$ data collection time, and $y_n$ is the filtered data value for the $n^{th}$ data collection time.

11. The method of claim 10, wherein said recursive process is an Infinite Impulse Response filter.

12. The method of claim 10, wherein the filter lengths M and N are chosen with consideration to stability of said recursive process.

13. The method of claim 12, wherein $M \leq N$.

14. The method of claim 10, further comprising after applying said recursive process to the temporal frequency component of the data: applying a second recursive process in an opposite direction to the data component, said second recursive process being mathematically expressible as $$y_n = \sum_{k=0}^{M} c_k x_{n+k} + \sum_{j=1}^{N} d_j y_{n+j}$$

thereby compensating for a phase shift applied to the data by application of the first recursive process.

15. The method of claim 2, wherein said step of applying a low-pass filter comprises:
 a. taking the logarithm of said temporal frequency component to form a second data set;
 b. Fourier transforming said second data set to the frequency domain;
 c. reducing the magnitude of one or more data values above said cutoff frequency in said second data set to form a third data set;
 d. inverse Fourier transforming said third data set to generate a fourth data set; and
 e. exponentiating said fourth data set to form a fifth data set comprising said sequence of filtered data values.

16. The method of claim 15, wherein said one or more data values above said cutoff frequency are reduced by setting them to zero.

17. The method of claim 16, wherein all frequency components above said cutoff frequency are set to zero.

18. The method of claim 16, wherein all frequency components exceeding said cutoff frequency by a selected amount $\Delta f$ are set to zero.

19. The method of claim 18, comprising an additional step of multiplying frequency components in the range $f_{Cutoff} - \Delta f$ to $f_{Cutoff} + \Delta f$ within said third data set by a linear taper prior to inverse Fourier transforming said third data set.

20. The method of claim 18, comprising an additional step of multiplying frequency components in the range $f_{Cutoff} - \Delta f$ to $f_{Cutoff} + \Delta f$ within said third data set by a squared cosine bell prior to inverse Fourier transforming said third data set.

21. The method of claim 2, wherein said step of applying a low-pass filter comprises:
 (a) organizing said temporal frequency component of the data according to receiver-source separation, called offset, and Fourier transforming from the offset variable to a frequency variable, i.e transforming from offset domain to frequency domain;
 (b) adjusting the transformed data values by reducing them depending on relationship to the cutoff frequency; and
 (c) inverse Fourier transforming the adjusted data values back to the offset domain.

22. The method of claim 1, further comprising:
 a. selecting a second cutoff frequency, said second cutoff frequency being selected to differentiate sharply varying response inconsistent with earth resistivity from gradually varying response in said sequence of filtered data values;
 b. applying a second filter to said filtered data values; and,
 c. generating a second sequence of filtered data values.

23. The method of claim 22 wherein said second filter is a low-pass filter.

24. A method for producing hydrocarbons from a subterranean formation, comprising:
 (a) obtaining survey data from a controlled source electromagnetic survey of a subterranean region containing said subterranean formation;
 (b) obtaining a temporal frequency component from the data, said temporal frequency being selected from said controlled source's frequency spectrum;

(c) selecting a cutoff frequency, said cutoff frequency being selected to differentiate sharply varying response, inconsistent with the source's signal and earth resistivity, from gradually varying response;

(d) applying a low-pass filter to said temporal frequency component of said data, said low-pass filter being designed to suppress frequencies above said cutoff frequency, generating thereby a sequence of noise-filtered data values; and (e) producing hydrocarbons from the formation using the noise-filtered data to determine presence of hydrocarbons.

* * * * *